Figure 1:
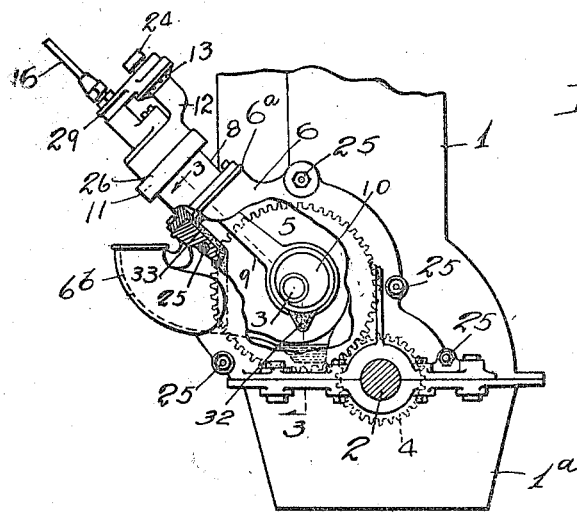
Figure 4:
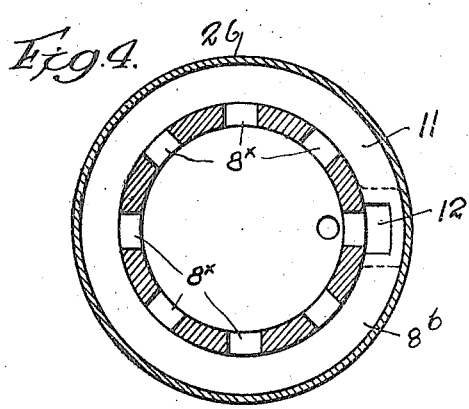
Figure 5:
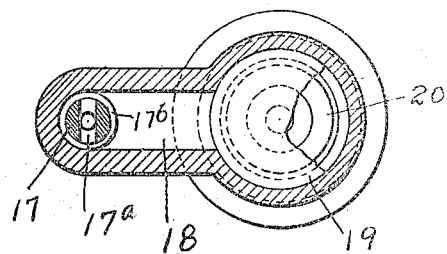
Figure 6:
Figure 7:
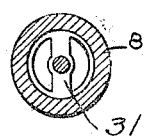

J. K. STEWART.
ENGINE DRIVEN AIR PUMP.
APPLICATION FILED AUG. 11, 1915.

1,196,609.

Patented Aug. 29, 1916.
2 SHEETS—SHEET 1.

Witnesses:

Inventor
John K. Stewart;
by Burton & Burton
his Attys.

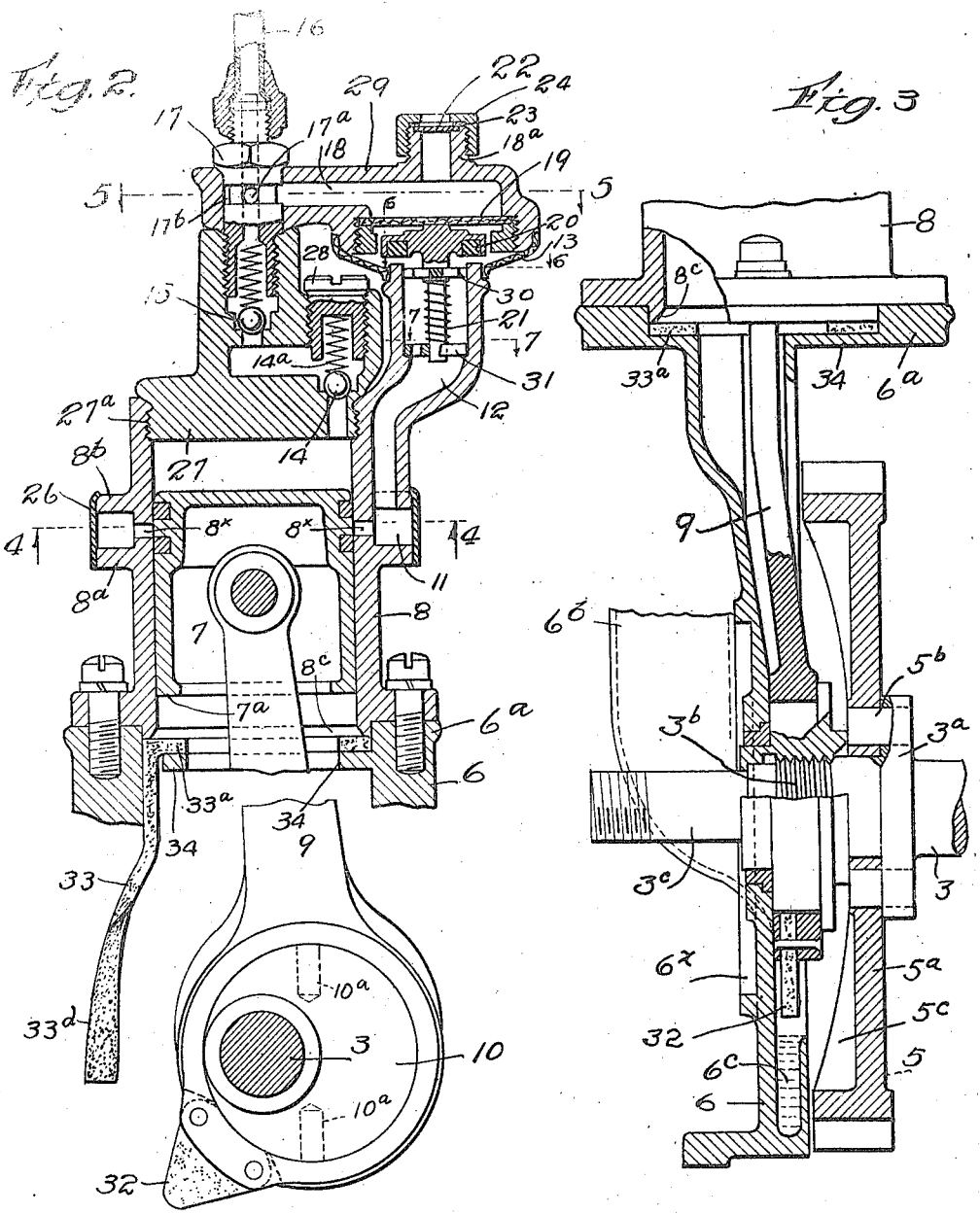

UNITED STATES PATENT OFFICE.

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

ENGINE-DRIVEN AIR-PUMP.

1,196,609.   Specification of Letters Patent.   Patented Aug. 29, 1916.

Application filed August 11, 1915. Serial No. 45,075.

*To all whom it may concern:*

Be it known that I, JOHN K. STEWART, a citizen of the United States, residing at Chicago, in the county of Cook and State of Illinois, have invented new and useful Improvements in Engine-Driven Air-Pumps, of which the following is a specification, reference being had to the accompanying drawings, forming a part thereof.

This invention relates to an air pump or compressor especially designed to be driven by and mounted directly upon the engine of a motor vehicle for supplying compressed air for various purposes about the vehicle, as for inflating tires, or operating an engine-starting device.

The invention involves various elements and features of construction shown in the drawings and described hereinafter, as particularly indicated by the appended claims.

In the drawings: Figure 1 is a front elevation showing a part of the automobile engine with the pump mounted upon it, a portion of the pump casing being broken away to disclose the interior details. Fig. 2 is a vertical section taken transaxially with respect to the driving shaft of the pump. Fig. 3 is a detail section taken as indicated at line 3—3, on Fig. 1. Figs. 4, 5, 6 and 7, are detail sections, all taken as indicated by their respective section lines on Fig. 2.

The automobile engine, 1, for which this pump is especially designed, is of the four-cycle type, having a crank shaft, 2, and a cam shaft, 3, for operating its valves, geared to rotate at one-half the speed of the crank shaft, as indicated by the relative sizes of the gears, 4, and 5, shown in dotted lines in Fig. 1. In the engine as originally constructed, the gears, 4 and 5, are provided with a removable cover plate or casing, and the air pump embodying this invention is consequently designed with a base, 6, adapted to replace the original gear casing so as to support the pump directly and permanently upon the engine, 1.

As illustrated, the pump is a single-cylinder compressor having a piston, 7, arranged for reciprocation in a cylinder, 8, by means of a pitman, 9. In the engine for which the pump is designed the timing gear, 5, comprises a web, $5^a$, having projections, $5^b$, which enter holes in a flange, $3^a$, of the cam shaft, 3. The face of the gear is unsymmetrically disposed upon the web, $5^a$, extending forward from it and being braced by ribbed spokes, $5^c$. The center of the gear being little thicker than the web, $5^a$, is clamped against the flange, $3^a$, by a nut screwed on to the threaded portion, $3^b$, of the shaft, and for operating the air pump the said nut is replaced by an eccentric, 10, whose thickness in axial direction is substantially the same as that of the original nut. The face of the gear, 5, thus slightly overhangs the eccentric, 10, necessitating the bent form of the pitman, 9, indicated in Fig. 3, but by limiting the thickness of the eccentric member, 10, to the thickness of the original nut the end portion, $3^c$, of the shaft, 3, is left clear to receive the commutator as in the original construction. The casing wall, 6, is provided with an annular recess, $6^x$, to receive the commutator cover, not shown.

Now, whenever the engine is running, the piston, 7, will be reciprocated in the cylinder, 8. Just at the lower limit of its stroke the piston, 7, uncovers a series of intake ports, $8^x$, in the wall of the cylinder, 8, said ports all communicating through an annular manifold, 11, with an inlet conduit, 12, into which the exterior air is drawn through a screen, 13. It will be understood that the descent of the piston, 7, in its cylinder, 8, will produce a partial vacuum in the cylinder which, however, will be relieved immediately upon the uncovering of the ports, $8^x$, so that substantially atmospheric pressure is restored within the cylinder before the piston reverses its direction of travel. This air is then compressed as the piston rises and forced out of the cylinder past the two check valves, 14 and 15, respectively, whence it is conveyed away to a pressure tank or other container through the pipe, 16.

The pipe, 16, is connected to the pump through a fitting, 17, which is transversely apertured at $17^a$, and circumferentially grooved at $17^b$, so as to communicate at all times with a pressure chamber, 18, associated with the pump itself. One wall of the chamber, 18, consists of a flexible diaphragm, 19, and just outside the chamber, 18, there is mounted a valve, 20, adapted to control the intake conduit, 12, and arranged in contact with the diaphragm, 19; thus when the pressure in the conduit, 16, becomes sufficiently great, the diaphragm, 19, is bulged outwardly, moving the valve, 20, onto its seat at the end opening of the conduit, 12, and thus shutting off the supply of air to the inlet ports, 8ˣ. While the diaphragm, 19, may be such as to yield quite readily under comparatively low pressure, it may be supplemented by a spring, 21, arranged to resist the closing of the valve, 20, and by the proper selection and adjustment of the spring, 21, the limiting pressure obtainable in the conduit, 16, and chamber, 18, may be quite closely predetermined. When this limit has been reached and the supply of incoming air cut off by the valve, 20, the piston, 7, will simply reciprocate in a partial vacuum, but practically all the work of rarefaction done by the piston in its down stroke will be returned to it in its upward stroke by virtue of the elasticity of the air in the cylinder, 8, so that the total net power required to operate the pump under this condition will be very small.

To safeguard the pressure tank or other receptacle to which the pipe, 16, leads, the pressure chamber, 18, is provided with a second diaphragm, 22, made of such material and of such dimensions that it will be ruptured by any pressure much in excess of the desired limit in case the controlling valve, 20, should for any reason fail to operate at the proper time. As shown in Fig. 2, the diaphragm, 22, is secured in place over the end of the threaded boss, 18ª, by means of a washer, 23, and an apertured cap, 24, screwed onto the boss, 18ª, to permit of easy replacement of the diaphragm, 22, if it should be ruptured as described.

From a manufacturing point of view, it will be seen that this pump is quite simple to assemble. The casing, 6, is substantially similar to the gear casing which it replaces, being held in position by cap screws, 25, but instead of completely inclosing the gear, 5, it is provided with a mounting flange, 6ª, to which the cylinder casting, 8, is attached, as shown in Fig. 2. In the cylinder casting the intake manifold, 11, is quite simply formed of two circular flanges, 8ª and 8ᵇ, and a flat ring, 26, peripherally shrunk onto said flanges so as to inclose the space between them. The head of the cylinder is made in a separate casting, 27, screwed in place at 27ª, and interiorly formed with seats for the check valves, 14 and 15, and a passage connecting them. The first check valve ball, 14, is held in position by a spring, 14ª, and an inclosing cap, 28, screwed into the casting, 27, while a similar construction is applied to the check valve, 15, except that the inclosing cap is formed as a part of the fitting, 17, and this fitting also serves to hold in place the casting, 29, containing the pressure chamber, 18, and the diaphragm, 19. The part, 29, may be rotated upon the fitting, 17, so as to bring its diaphragm, 19, directly over the valve, 20, carried in guides, 30 and 31, formed in the cylinder casting, 8, and when the parts are thus positioned, the air filter screen, 13, serves to hold the part, 29, in such registration.

An important feature of this pump is the method of lubricating the piston and also the eccentric, 10, which drives it. The crank case, 1ª, of the engine, 1, is intended to contain a quantity of oil for lubricating the engine crank and piston by the splash system, and the filler spout for this oil reservoir, 1ª, is formed as a part of the gear casing, 6, as indicated at 6ᵇ in Fig. 1. As the oil is poured into the spout, 6ᵇ, it flows past the gear, 5, into the crank case, 1ª, but the casting, 6, is formed with a small branch trough, 6ᶜ, leading from the spout, 6ᵇ, to a position directly under the eccentric, 10. The large end of the pitman, 9, which serves as an eccentric strap and engages the eccentric, 10, carries a triangular oil wick, 32, mounted with one of its sides in contact with the bearing surface of the eccentric cam and with its opposite apex arranged to dip into the trough, 6ᶜ, as the eccentric passes through the lower portion of its stroke. Thus the wick, 32, is kept soaked with oil and furnishes such oil for lubricating the bearing surfaces of the eccentric, 10, and the pitman, 9. The eccentric, 10, may also be provided with oil pockets, 10ª, drilled into its body from its bearing surface, as indicated in Fig. 2, and adapted to accommodate a reserve quantity of oil, taking it from the wick, 32, and distributing it as needed to the bearing surface. The lubrication of the pitman, 7, is also accomplished by means of an oil wick, 33. This wick has an annular portion, 33ª, supported on a ledge, 34, just below the lower limit of travel of the pitman, 7. A depending portion, 33ᵈ, trails in the oil in the crank case and also depends into the path of the oil as it is poured through the filler spout, 6ᵇ, into the crank case, 1ª, and thus feeds the oil by capillary action up to the annular portion of the wick, 33ª. The latter is so positioned as to be slightly compressed by the lower end, 7ª, of the piston, 7, in its lowest position, and this compression of the wick serves to expel a quantity of oil for lubrication of the piston and the cylinder wall. Preferably that portion of the cylinder wall adjoining the wick, 33, is beveled as indicated at 8ᶜ, to provide a slight clearance space to receive the oil thus expelled from the wick and to deflect it onto the cylindrical wall of the piston, 7. With the source of piston lubrication at the lower end of the piston as thus arranged, there is very little opportunity for an excessive quantity of oil reaching the upper portion of the piston and becoming mixed with the air compressed thereby; obviously this adapts the pump to be used for inflating rubber tires in which the injection of even a small quantity of oil with the air would tend to be injurious to the rubber.

I claim:

1. In a piston pump in combination with the cylinder and piston, an annular oil wick mounted in the cylinder in the path of the piston near one limit of its travel, said wick being arranged to be compressed by the end of said piston for expressing lubricating oil to the piston and cylinder walls.

2. In a piston pump, a casing having a ledge positioned just below the lower limit of travel of the piston in its cylinder and an annular oil wick mounted on said ledge and adapted to be compressed by the end of the piston for expressing lubricating oil to said piston and to the cylinder wall.

3. In a piston pump an annular oil wick mounted in the cylinder in the path of the piston near one limit of its travel, said wick being arranged to be compressed by the end of said piston for expressing lubricating oil, and the portion of the cylinder wall adjacent to said wick and opposite the cylindrical portion of the piston being beveled away from said piston to provide clearance space to receive such oil and to deflect the oil onto the piston wall.

4. In a piston pump having a crank case provided with a filler spout to receive lubricating oil; an annular oil wick mounted for contact with the piston for lubricating the latter and having a portion depending into said filler spout to receive oil as it is poured into the crank case, and adapted to convey such oil by capillary action to the annular portion of the wick for lubrication of the piston.

5. In combination with a power shaft having a crank portion and a pitman operatively engaged therewith; means for lubricating the pitman crank bearing comprising an oil wick carried by the pitman and having a portion in contact with the bearing surface of said crank, and another portion extending outwardly from the crank center; an oil receptacle into which said extending portion of the oil wick may be dipped as the crank revolves, and an oil pocket in the body of the said crank and opening into the bearing surface thereof, adapted to receive oil from the wick as it traverses the latter during the rotation of the power shaft.

6. In combination with an engine having a crank case adapted to serve as an oil reservoir, and a secondary device mounted upon said engine and adapted to be driven thereby, said device having a power crank and a pitman operatively engaged therewith; means for lubricating the crank bearing of said pitman, comprising an oil wick carried by the pitman with a portion in contact with the bearing surface of the crank and another portion extending outwardly from the crank center, together with a crank case for said device designed to communicate with the crank case of the engine, and including an oil filler spout, said spout being formed with a trough leading under the said pitman and adapted to contain oil into which the said extending portion of the oil wick may be dipped as the said power crank revolves.

In testimony whereof, I have hereunto set my hand at Chicago, Illinois, this 22nd day of July, 1915.

JOHN K. STEWART.

Witnesses:
 LUCY I. STONE,
 CHAS. S. BURTON.